(12) United States Patent
Weston

(10) Patent No.: US 9,131,126 B2
(45) Date of Patent: Sep. 8, 2015

(54) REPAIRING SCRATCH IMPAIRMENTS TO AN IMAGE

(75) Inventor: Martin Weston, Petersfield (GB)

(73) Assignee: Snell Limited, Reading (GB)

( * ) Notice: Subject to any disclaimer, the term of this patent is extended or adjusted under 35 U.S.C. 154(b) by 169 days.

(21) Appl. No.: 13/083,446

(22) Filed: Apr. 8, 2011

(65) Prior Publication Data

US 2011/0249187 A1  Oct. 13, 2011

(30) Foreign Application Priority Data

Apr. 9, 2010 (GB) .................................. 1005986.3

(51) Int. Cl.
| H04N 5/00 | (2011.01) |
|---|---|
| H04N 5/217 | (2011.01) |
| H04N 7/18 | (2006.01) |
| H04N 5/257 | (2006.01) |
| H04N 5/208 | (2006.01) |
| H04N 1/409 | (2006.01) |
| H04N 5/21 | (2006.01) |
| H04N 5/253 | (2006.01) |

(52) U.S. Cl.
CPC ............. *H04N 5/208* (2013.01); *H04N 1/4097* (2013.01); *H04N 5/21* (2013.01); *H04N 5/253* (2013.01)

(58) Field of Classification Search
USPC ........... 348/606, 241, 125; 382/275; 435/6.16
See application file for complete search history.

(56) References Cited

U.S. PATENT DOCUMENTS

| 5,204,910 | A | * | 4/1993 | Lebeau | ........................ | 382/152 |
|---|---|---|---|---|---|---|
| 5,327,247 | A | * | 7/1994 | Osborne et al. | ............... | 348/100 |
| 5,881,182 | A | | 3/1999 | Fiete et al. | | |
| 6,388,704 | B1 | * | 5/2002 | Wischermann | ................ | 348/125 |
| 6,487,321 | B1 | | 11/2002 | Edgar et al. | | |
| 7,295,233 | B2 | * | 11/2007 | Steinberg et al. | ............. | 348/241 |
| 7,308,156 | B2 | * | 12/2007 | Steinberg et al. | ............. | 382/294 |
| 7,630,286 | B2 | * | 12/2009 | Moriwaki et al. | ............ | 369/59.2 |
| 2003/0068096 | A1 | * | 4/2003 | Dupont et al. | ................. | 382/275 |
| 2003/0156222 | A1 | * | 8/2003 | Weston et al. | ................. | 348/606 |
| 2005/0058366 | A1 | * | 3/2005 | Jiang et al. | ..................... | 382/275 |
| 2007/0242880 | A1 | * | 10/2007 | Stebbings | ...................... | 382/172 |
| 2008/0152255 | A1 | * | 6/2008 | Steinberg et al. | ............. | 382/275 |
| 2008/0172704 | A1 | * | 7/2008 | Montazemi | .................... | 725/105 |
| 2008/0261218 | A1 | * | 10/2008 | Tsuang et al. | .................... | 435/6 |
| 2010/0259622 | A1 | * | 10/2010 | Steinberg et al. | ............. | 348/187 |
| 2010/0321537 | A1 | * | 12/2010 | Zamfir et al. | ................. | 348/241 |
| 2011/0063599 | A1 | * | 3/2011 | Wang et al. | ..................... | 355/75 |

FOREIGN PATENT DOCUMENTS

| GB | 2 356 514 A | 5/2001 |
|---|---|---|
| GB | 2 370 933 A | 7/2002 |

OTHER PUBLICATIONS

Extended European Search Report mailed May 26, 2011, issued in corresponding European Application No. EP 11 15 8743, 6 pages.
Search Report Under Section 17 mailed Jun. 15, 2010, in corresponding Great Britain Patent Application No. GB 1005986.3, filed Apr. 9, 2010, 1 page.

* cited by examiner

*Primary Examiner* — Hunter B Lonsberry
*Assistant Examiner* — Tariq Gbond
(74) *Attorney, Agent, or Firm* — Christensen O'Connor Johnson Kindness PLLC

(57) ABSTRACT

A method for repairing scratch impairments in which brightness values for a set of points within a narrow region of the impaired input image that is aligned with an expected scratch direction are modified in a scratch repair process; and the scratch repair process is controlled in dependence upon the relationship between the impaired brightness values and corresponding modified brightness values.

20 Claims, 6 Drawing Sheets

Figure 2

REPAIRING SCRATCH IMPAIRMENTS TO AN IMAGE

FIELD OF INVENTION

This invention concerns image processing, and in particular the repair of linear impairments such as scratches.

BACKGROUND OF THE INVENTION

UK Patent GB 2 361 133 describes techniques for reducing the visibility of image impairments such as those caused by scratches to photographic film. Typically these methods form part of video signal processing that is applied to the output of a telecine process that scans film frames to create a video tape or file.

Typically, when a scratched film is scanned in a telecine to find brightness values for pixels, pixels close to scratches will be found to be less bright, because the scratch will have spread the light used to analyse the film in an unexpected direction that is (usually) not measured in the scanning process. Either negative or positive film may be scanned, and so a scratch may also result in brighter pixels when the image is displayed.

In order to appreciate the improved processing of the present invention it is helpful to review the principles of the above-referenced prior patent; FIG. 1 illustrates these. The figure assumes a real-time, streaming system but processing delays are ignored; it is assumed that when results from different blocks in the diagram are combined, the relative timing is adjusted so that data from equivalent image regions is combined. The following description also assumes that the image is represented as an array of pixels and the processing acts on pixel values. (These assumptions will be applied throughout this specification.)

The system of FIG. 1 repairs vertical scratches. Input video data (1) is passed to a horizontal median filter (2), which compares the value of each pixel with the values of its horizontally adjacent neighbours and, if its value is not the middle ranking member of the set of compared values, it replaces its value with the middle ranking value. This process removes vertical dark or light lines due to scratches, but also removes wanted picture information and noise.

The output from the median filter (2) is subtracted from the video data (1) in a subtractor (3). The result is a signal that represents scratches, some horizontal picture detail and noise. This signal is applied to a vertical low-pass filter (4), which removes most of the noise and some of the picture detail leaving a relatively 'clean' representation of the scratches.

The output of the vertical filter (4) is applied to a clipper (5), which has unity gain for signal values close to the value of a control parameter and low gain for other values. The purpose of this clipper is to remove remaining picture detail from the representation of the scratches. Typical scratches have a nearly constant value along their length, whereas typical picture detail will vary in the vertical direction. If the clipper's control parameter is made equal to the level of the scratch, then the picture detail differing from this level will be removed by the clipper.

The setting of the clipper control parameter is determined by a vertical averager (6) that vertically averages the output of the subtractor (3) so as to obtain an average pixel value corresponding to every horizontal position in the image. For example, in the typical case of an orthogonal array of digital active lines of pixels, there will be a set of N average values, where N is the number of pixels per digital active line. As scratches are likely to extend vertically over a significant portion of the image, the average value at the location of a scratch is likely to be equal to the value of the scratch. Picture information is much less likely to influence the average value.

At each horizontal position in the image the control parameter of the clipper (5) is made equal to the corresponding average value from the vertical averager (6). The clipper (5) thus passes the scratch representation but attenuates residual picture detail; its output (7) is thus a substantially noise-free representation of any scratches present in the input video data (1).

The scratch representation (7) is subtracted from the input video data (1) in a subtractor (8) so as to obtain 'repaired' video data (9).

There are several areas where the performance of this prior art scratch repair process can be improved. Listed below are some of the sources of error in the determination of the scratch, that is to say the signal (7) that will be subtracted from the input data (1) so as to repair the scratch.

Noise and film grain in the input data (1) are rectified by the non-linearity of the median filter (2). The resulting, spurious, low frequency components can pass through the processing chain and become combined with the repaired data (9).

Scratches do not always correspond to a fixed change in pixel values along their length. The loss of light (that would have been measured in order to find a pixel value when scanning a film frame) due to a scratch on the film surface often depends on the amount of light transmitted by the film in the vicinity of the scratch. In this case a vertically low-pass filtered difference signal cannot match the scratch.

Scratches may vary in 'depth' along their length. These variations cannot be tracked by a vertically low-pass filtered difference signal.

Clipping may not remove all the contributions to the difference signal from picture detail.

Scratches are not always exactly vertical.

Some or all of these, or other, deficiencies of the prior art can be avoided or ameliorated by the techniques of the present invention.

SUMMARY OF THE INVENTION

The invention consists in a method and apparatus for repairing scratch impairments to an input image that provides a repaired output image in which brightness values for a set of points within a narrow region of the impaired input image that is aligned with an expected scratch direction are modified in a scratch repair process a measure of the relationship between the impaired brightness values and corresponding modified brightness values is evaluated for the said set of points and the scratch repair process that provides the said repaired output image is controlled in dependence upon the said measure.

Suitably, the measure of the relationship is compared with an expected relationship measure for of a set of scratch impaired points and a scratch repair that is applied to the said image region is inhibited when the result of the said comparison is unlike the expected result.

Advantageously, the measure of the relationship is used to predict the expected brightness error due to a scratch for a point in the image and a brightness change that repairs scratch impairment at the said point is limited in dependence upon the predicted brightness error.

In certain embodiments the relationship between the impaired brightness values and corresponding modified brightness values is represented by a mathematical model.

And, the parameters of the model are derived by statistical analysis of the said set of brightness values.

In a preferred embodiment, the model is a linear model and its parameters are derived by linear regression.

And, the said scratch repair process that provides a repaired output image creates a correction signal that is combined with the input image to create a repaired output image by the steps of:

Noise reducing the input image
applying a scratch repair process to the noise-reduced input image
taking the difference between the input and the output of that scratch repair process as the said scratch correction signal.

BRIEF DESCRIPTION OF THE DRAWINGS

An example of the invention will now be described with reference to the drawings in which.

DETAILED DESCRIPTION OF THE INVENTION

Figure 1:
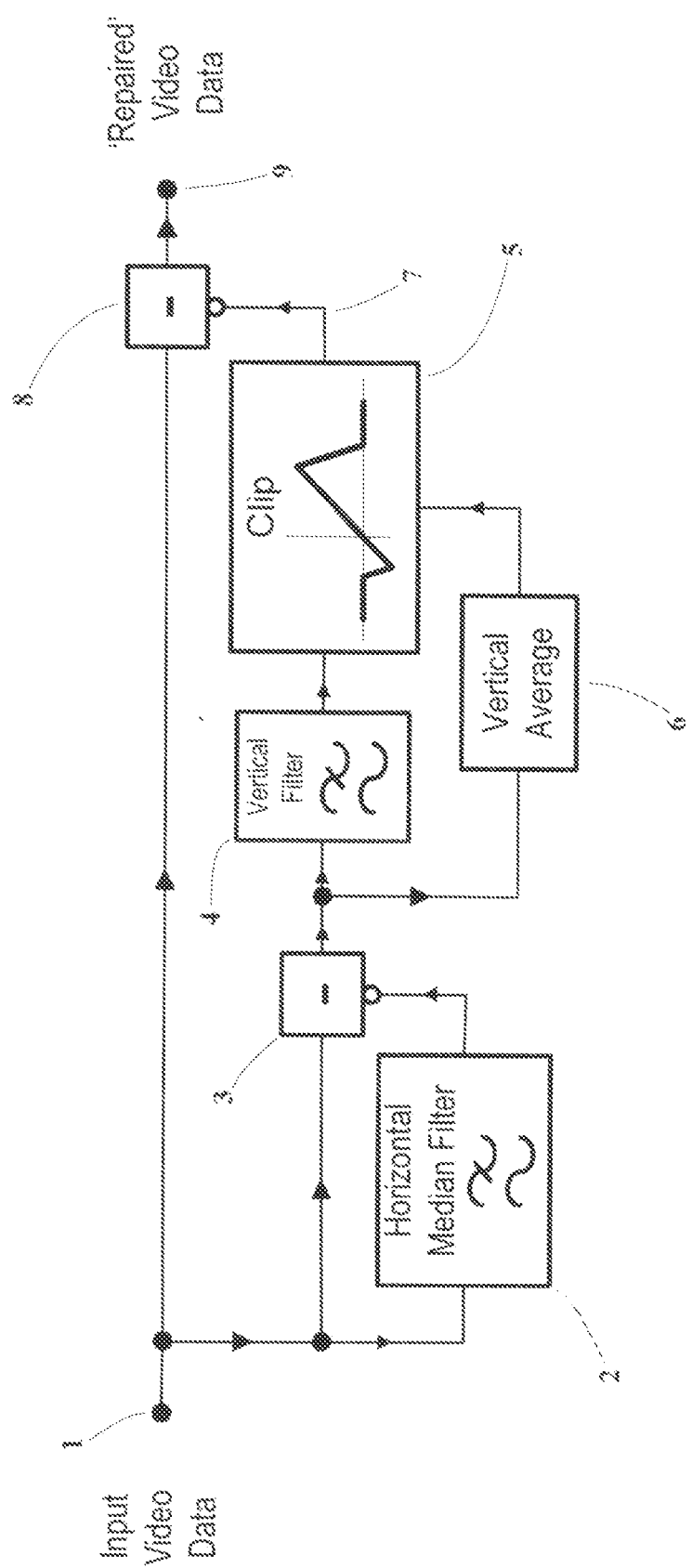
FIG. 1 shows a block diagram of a prior art scratch repair system.
Figure 2:
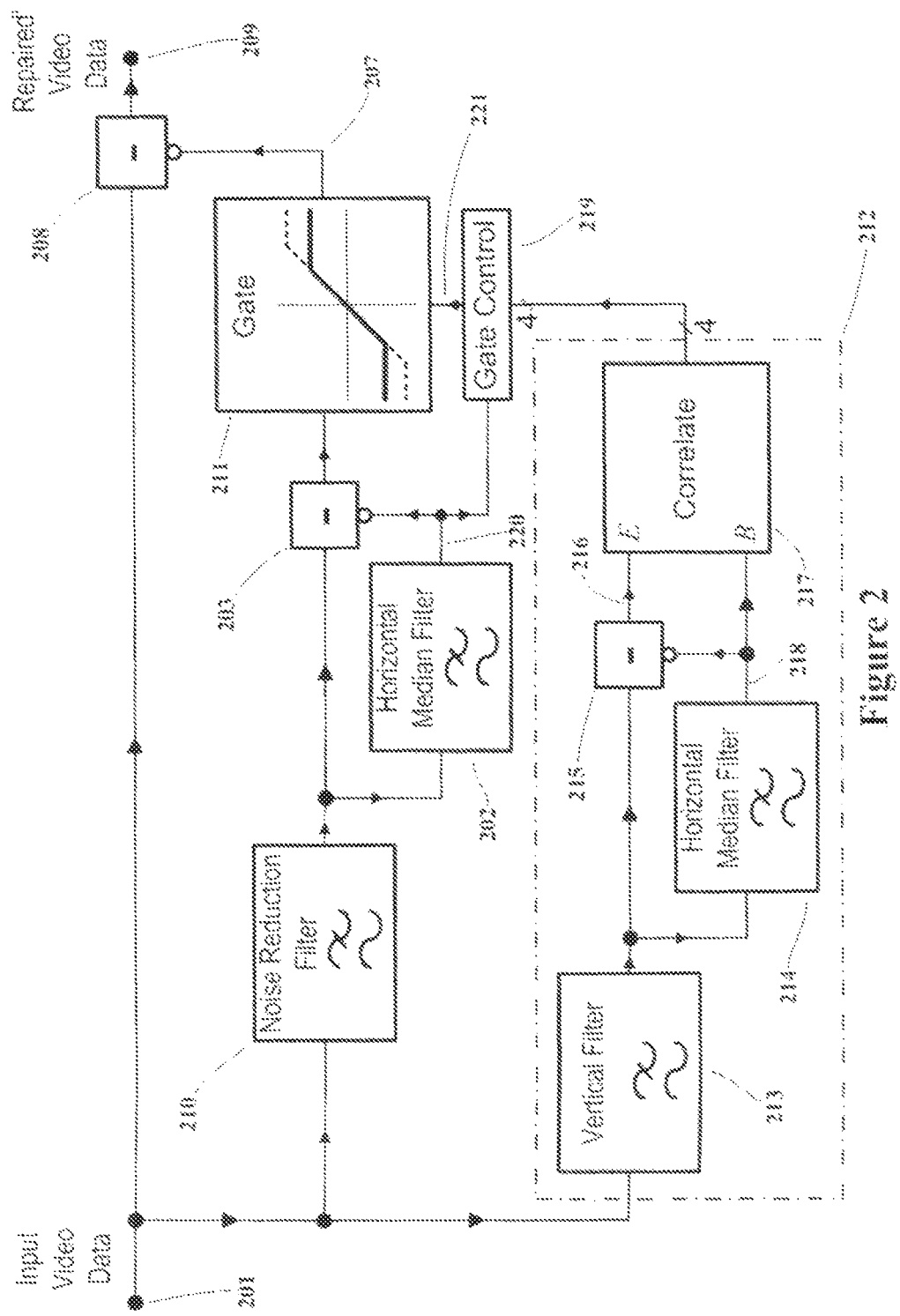
FIG. 2 shows a block diagram of a scratch repair system according to an embodiment of the invention.

FIG. 2 shows a block diagram of an exemplary improved scratch repair system according to an embodiment of the invention. Some blocks have similar or identical functions to blocks in the prior art system of FIG. 1; these have corresponding designatory numerals so that (1) in FIG. 1 corresponds with (201) in FIG. 2 etc.

Referring to FIG. 2, a noise reduction filter block (210) is placed at the input of the signal path leading to the derivation of an improved scratch repair signal (207). Elimination of noise at the output of the subtractor (3) was one of the functions of the filter (4) in the system of FIG. 1; in the improved system of FIG. 2 there is no filter in this position. By replacing the narrow bandwidth vertical filter by noise reduction, a more accurate representation of complex scratches can be made available to the repair system. For example, scratches which vary in amplitude in dependence on nearby picture content, or which vary in depth along their length, can be separated out and repaired by subtracting the separated scratch from the input image data.

Figure 3:
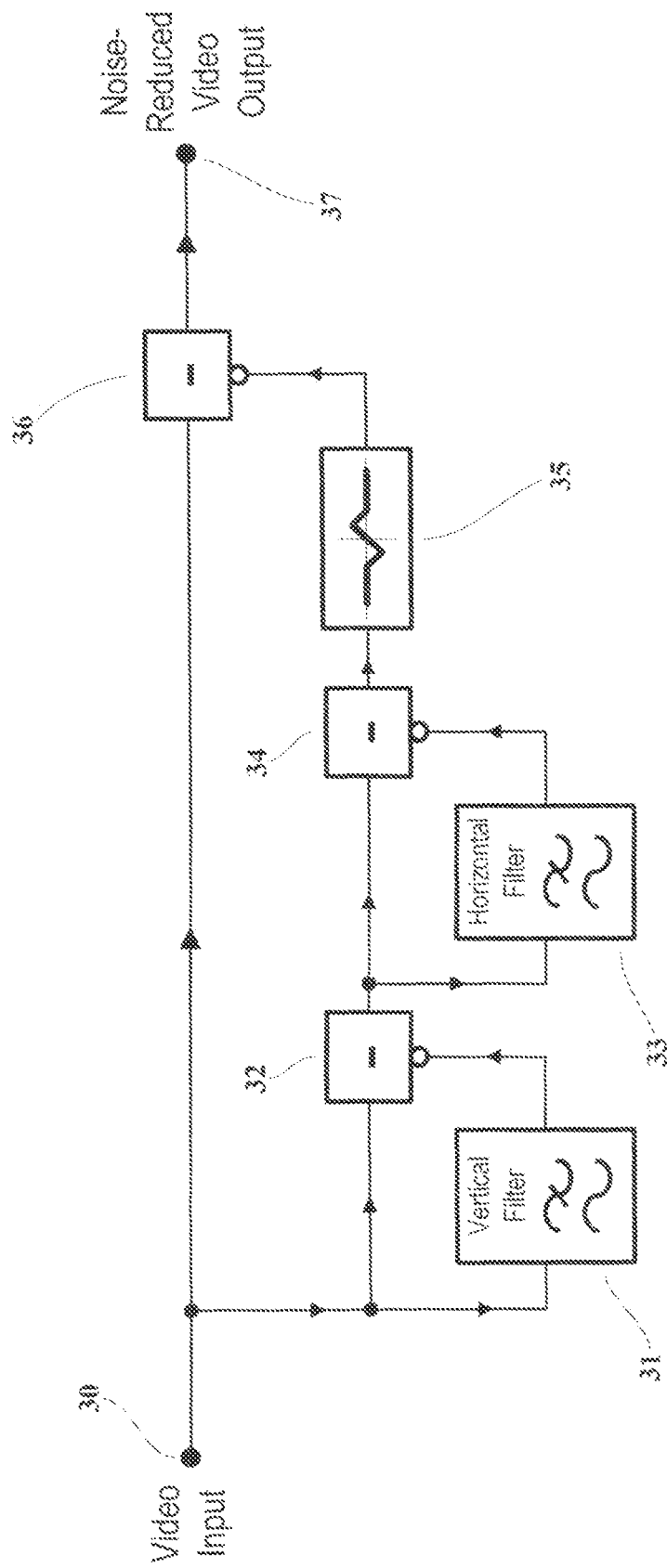
FIG. 3 shows a block diagram of a noise reduction filter.

The noise reduction filter block (210) can use any known method of noise reduction; however FIG. 3 shows a noise reduction process that is particularly suited to this application. The filter input (30) is filtered in vertical low-pass filter (31) and the result subtracted from the input (30) in a subtractor (32) to obtain high vertical frequency components. This result is horizontally filtered in a horizontal filter (33) and subtracted from the output of the subtractor (32) in a second subtractor (34), so as to obtain high diagonal frequencies. The result is passed to an 'inverse-coring' block (35) which has unity gain for low-amplitude signals but attenuates larger-amplitude signals.

The inverse-cored high-frequency diagonal components are subtracted from the filter input (30) in a third subtractor (36). The result is a noise reduced output (37).

The filters (31) and (33) have low cut-off frequencies and may conveniently be running-sum filters that average vertically-aligned pixels (for the vertical filter (31)) and horizontally-aligned pixels (for the horizontal filter (33)) respectively. The resulting filtered output (36) accurately reproduces scratches, which are tall, narrow image features, but lacks high-frequency noise.

Returning to FIG. 2, the clipper (5) of the prior art has been replaced by a more complex amplitude limitation process that only allows pixel values likely to represent scratches to pass to the subtractor (208). The scratch representation signal (207) is formed by limiting the amplitude of the output from the subtractor (203) in a gate (211). The gate is controlled by a scratch detection process (212) that operates as follows:

The input video data (201) is filtered in a vertical low pass filter, (213). A suitable filter is a 'running-sum' vertical filter that averages vertically-adjacent pixels. The filtered video data is input to a horizontal median (or other scratch removal) filter (214), and the difference between the input and output of the median filter (214) is formed in a subtractor (215). The subtractor output (216) is a representation of scratches together with high horizontal frequency picture detail. The horizontal median filter (214) has a narrow filter aperture so that its output contains as little picture detail as possible consistent with detection of the central part of any scratch.

A correlation block (217) compares the subtractor output (216) with the output (218) of the horizontal median filter (214) in a statistical process that evaluates the relationship between its respective input values. The output of the correlation process (217) is data relating to a model of this relationship. A separate evaluation is made for each horizontal position in the image, and information from all vertical positions is analysed at each horizontal position in each image. In the typical case of a standard-definition television image comprising 720 columns of vertically-aligned pixel there would be 720 correlation results for each image. If a non-orthogonal arrangement of pixels is used it will be necessary to define suitable columns of pixels to include in each analysis.

The data from the correlation process relating to the horizontal position of the current pixel is input to a gate control block (219), which uses it in conjunction with the output (220) from the median filter (202) to derive a gate control signal (221) for each image pixel. This signal varies depending on the likelihood that the output from the subtractor (203) represents a scratch. The operation of an exemplary correlation block will be described later with reference to FIG. 5, and the operation of an exemplarity gate control block will be described later with reference to FIG. 6.

The output (207) from the gate (211) represents the pixel value error due to scratch impairment for every pixel of the input data (201). The error values are subtracted from respective pixel values in the subtractor (208) so as to obtain repaired video data (209). Because the scratch signal (207) has not been vertically filtered it is able to represent scratches that vary along their length; and, the statistical processing in the correlation block (217) enables the gate (211) to remove picture detail from the correction signal (207) so as to ensure that it is not impaired at the output (209).

The inventor has appreciated that the amount of light that is lost (or gained) for a particular pixel can be expected to be in proportion to brightness of the image in the region of that pixel. A representation of a scratch artefact should therefore have an amplitude that is related to the local brightness.

Figure 4:
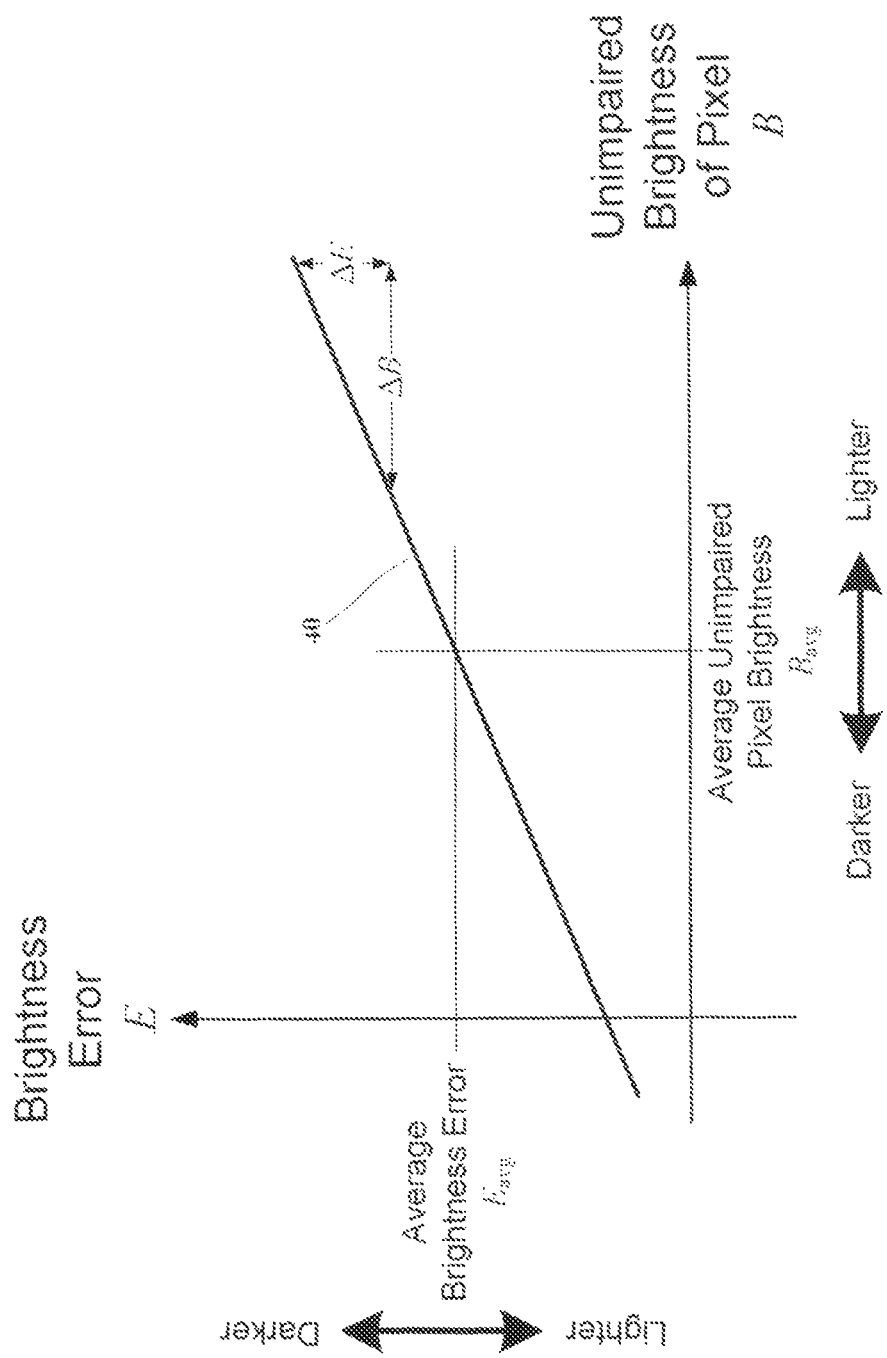
FIG. 4 shows a graph of a linear model of the relationship between the brightness error due to a scratch for a pixel and the error-free brightness of that pixel.

A suitable model of the expected relationship, for a set of pixels, between the pixel value error due to a particular scratch and the error-free value of that pixel is a linear relationship such as that shown (40) in FIG. 4. The Figure shows a graph of brightness error E versus unimpaired brightness B. The relationship can be characterised by three parameters: the average unimpaired brightness $B_{avg}$; the corresponding average brightness error $E_{avg}$; and, the slope of the relationship ($\Delta E \div \Delta B$). The positive direction of the E axis corresponds to darkening of pixels; and, the positive direction of the B axis corresponds to brighter pixels. The graph therefore represents a 'dark' scratch in which, as a result of the scratch, lighter pixels are darkened more than darker pixels. It can be seen that the expected error for a pixel is given by the equation:

$$E = E_{avg} + S \times (B - B_{avg}) \quad [1]$$

Where:
  E is the error for a pixel having unimpaired brightness B;
  S is the slope parameter ($\Delta E \div \Delta B$) of the model; and
  $E_{avg}$ and $B_{avg}$ are the other two parameters of the model.

Figure 5:
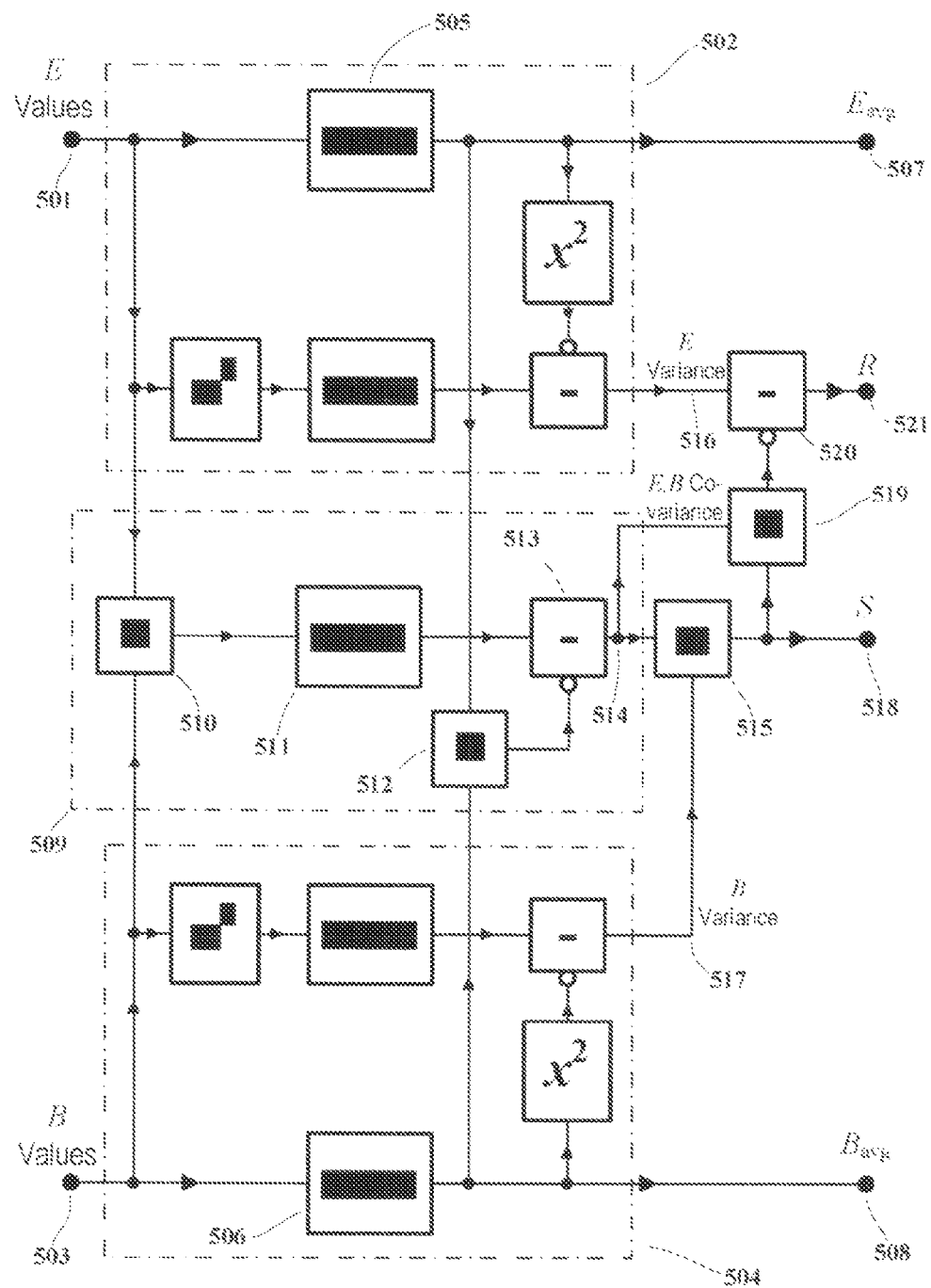
FIG. 5 shows a block diagram of a system for finding the parameters of a linear model that fits the relationship between the brightness error due to a scratch for a pixel and the error-free brightness of that pixel.

The parameters of this model can be fitted to the E and B values for a set of pixels by the well known process of linear regression. A suitable system is shown in FIG. 5. Referring to this Figure, the set of outputs (216) from the subtractor (215) of FIG. 2 for a column of pixels are input, at terminal (501), to a first average and variance determination process (502). These input values are respective differences between: the local brightness in the absence of a scratch, as estimated by the median filter (214); and, the brightness error due to the scratch, as determined by the subtractor (215). They are thus a set of E values for the column of pixels.

The corresponding set of outputs from the median filter (214) of FIG. 2 for the same column of pixels are input, at terminal (503), to a second average and variance determination process (504). These input values are local brightness values B for the column of pixels.

Respective averagers (505) and (506) compute the average $E_{avg}$ of the input values (501), and the average $B_{avg}$ of the input values (503); these are output at terminals (507) and (508) respectively. And, the respective variances of the set of E values and the set of B values are calculated by subtracting the square of the respective average from the respective average sum of the squares of the input values. The variance of the E values is output from the process (502) at terminal (516); and, the variance of the B values is output from the process (504) at terminal (517).

A covariance determination process (509) computes the covariance of the set of E values (501) and the set of B values (503). This is done by: taking the products of corresponding pairs of E and B values in the multiplier (510), averaging the results in the averager (511); forming the product of $E_{avg}$ and $B_{avg}$ in the multiplier (512); and subtracting the product of averages from the average of products in the subtractor (513). The result is the covariance value (514).

The slope parameter S is determined in a divider (515) that divides the covariance value (514) by the variance (517) of the B values computed by the processor (504). This is output at terminal (518).

The quality of the fit of the model to the input E and B values is determined by calculating a 'residual energy value' or 'residue parameter' from the surplus of the variance of the E values over the slope-weighted covariance. The covariance (514) is multiplied in multiplier (519) by the S parameter (518), and the result subtracted from the E variance (516) in subtractor (520). The result is a residue parameter R, which is output at terminal (521). The residue parameter enables scratched columns of pixels to be distinguished from unscratched columns.

Scratched pixels will fit the model, whereas unscratched pixels will not fit, thus spurious application of the repair process to unscratched areas of the image can be inhibited.

Figure 6:
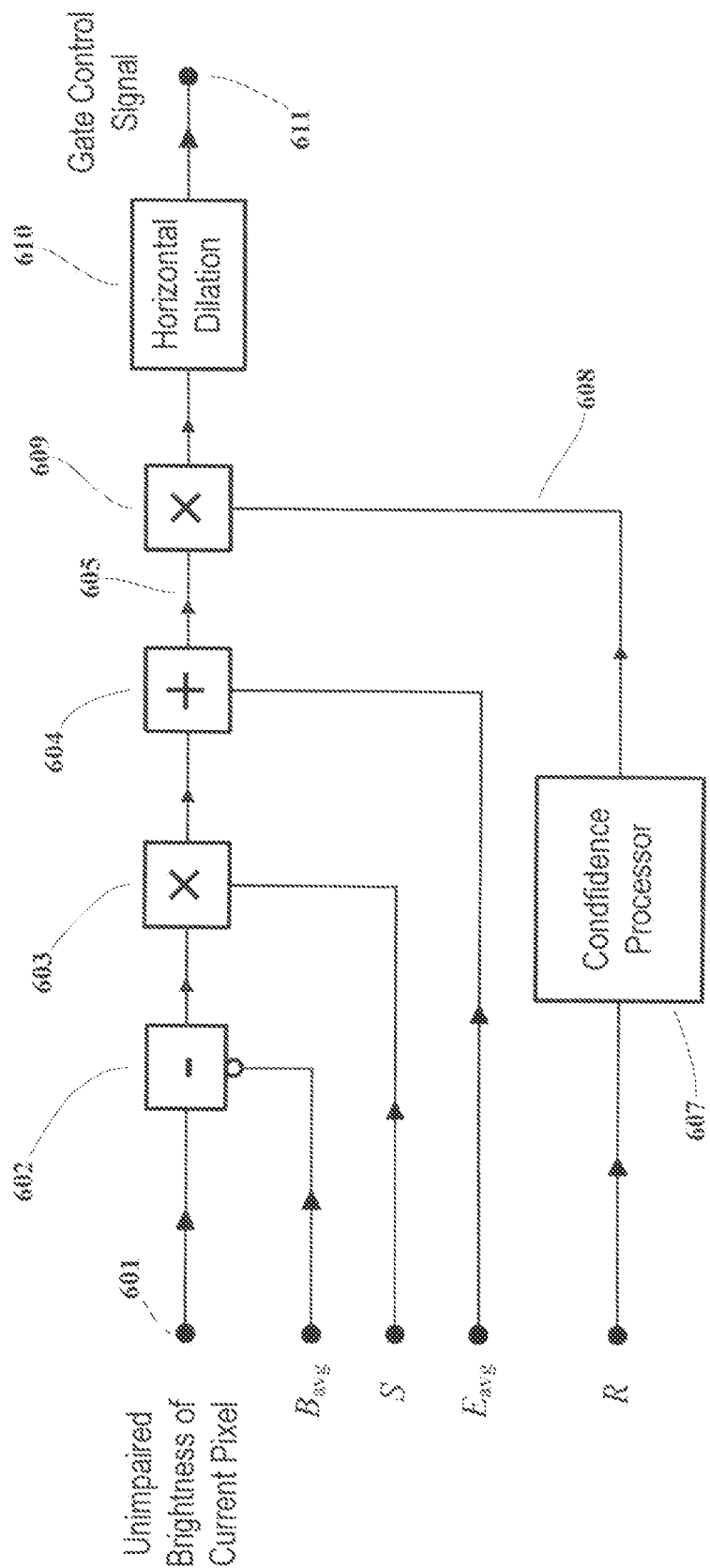
FIG. 6 shows a block diagram of a system that derives a control signal used in the system of FIG. 2.

The use of the model parameters, and the associated residue parameter, to derive the gate control signal for the processing of a pixel is shown in FIG. 6. The unimpaired brightness of the current pixel (as represented by the output (220) from the horizontal median filter (202) in FIG. 2) is input, at terminal (601), to the illustrated gate control signal derivation process. Note that this input value will accurately represent vertical picture detail because the only vertical processing that has been applied to it is the noise reduction filter (210), which only attenuates low-amplitude, diagonal frequency components.

The model parameters $B_{avg}$, S and $E_{avg}$ output from the system of FIG. 5 are input to subtractor (602), multiplier (603) and adder (604) respectively so as to obtain a pixel value error E, according to equation [1] above, for the current pixel at the output (605) from the adder (604). The relevant model parameters are those evaluated for a vertical column of pixels that includes the current pixel. This requires evaluation and storage of the model parameters for every horizontal position in the image prior to the processing of each input pixel value at the terminal (601).

The residue parameter R for the horizontal position of the current pixel is input to a confidence processor (607) to determine a confidence signal (608) that is multiplied by E signal (605) in a multiplier (609). The confidence signal is a little greater than unity when the parameter R is small; in this case the gate will allow scratch correction signals at least as big as the modelled error E to pass. However, when the parameter R is large the confidence signal is made small; in this case only low amplitude scratch correction signals are allowed through the gate. The confidence processor (607) may also make use of $E_{avg}$, or other signals in order to compute the confidence signal (608).

The output from the multiplier (609) is horizontally dilated in a dilation process (610) to form a gate control signal that is output at terminal (611). (This is the gate control signal (221) of FIG. 2.) The horizontal dilation process combines the control values for horizontally adjacent pixels by taking the maximum value over a small horizontal dilation aperture. This is necessary because the analysis process (212) uses a narrow median filter (214) which may not respond to the horizontal edges of scratches. The dilation also helps to correct scratches that are not completely vertical.

The amount of horizontal dilation of the gate control signal may vary at different vertical positions in the image. For example small, or zero, dilation may be applied at the vertical centre of the image and the dilation may increase in proportion to the vertical distance of the current pixel from a horizontal line through the image centre. This enables optimal processing of non-vertical, or slightly curving scratches.

Another method of improving the repair of non vertical scratches is to 'widen' the E signal (216) at the input to the correlation process (217). For positive signals widening corresponds to dilation. For negative signals widening corresponds to erosion, where the minimum is taken of horizontally shifted versions of the signal.

The gate (211) can be implemented by comparing its input with positive and negative threshold values and replacing input values that lie outside the range defined by these threshold values with the relevant threshold value. The magnitudes of the two thresholds can be made equal to the value of the gate control signal. Or, one of the thresholds can be made equal to a proportion of the control signal, so that the 'window' defined by the gate is not centred on zero amplitude. For example, if the scratches are known to be dark, the gate can limit positive correction signals more than negative signals. It is also possible to determine the positive and negative gate thresholds separately using different statistical model parameters derived respectively from positive and negative brightness error values.

Generally the median filter that is used to derive the scratch correction signal (e.g. the filter (210)) will have a wider filter aperture than the filter in the 'analysis and control' path (e.g. the filter (214)). A wide median can be implemented by cascading two or more narrow median filters.

In some applications it may be helpful to combine results from processes that use median filters having wider and narrower filter apertures that are optimised for different types of scratch. More than one correction signal can be derived from subtraction across different widths of median filter; and, more than one control signal can be derived from statistical processing of the E and B values derived from subtraction across different widths of median filter. Correction signals appropriate for wide scratches can be controlled by statistical results appropriate to wide scratches, and then combined with corrections signals appropriate to narrow scratches that have been controlled statistical results appropriate to narrow scratches.

There are many other ways of implementing the invention. It can be simplified so that the correlation process is applied to the inputs and outputs of the subtractor used to form the input to the gate, thus avoiding the need for the second median filter and subtractor. It need not be applied to real-time, streaming data. Files of video data can be processed and scratch impairments repaired. More-complex statistical models of the relationship between pixels value errors due to scratches and pixel brightness can be used. It may be helpful to combine information from adjacent fields or frames in order better to model the relationship between brightness and brightness error for a scratch at a particular position.

The invention may be applied to fields or frames of a video signal or file. In typical interlaced video the scratches will 'move' at frame rate and so it will usually be preferable to combine interlaced fields into frames for processing.

Typically the invention is applied to luminance values of pixels, however it may be applied to other values that represent an image, such as Red, Green or Blue values.

Although scratches have been assumed to be approximately vertical in the preceding description, the invention can equally be applied in the horizontal direction.

The invention claimed is:

1. Apparatus for repairing scratch impairments by modifying impaired brightness values of an input image to provide a repaired output image, the apparatus comprising: at least one scratch detection circuit configured to operate on the input image to produce a detected scratch signal; a gate control unit configured to receive a measure of unimpaired brightness and provide a gate control signal in dependence upon a predicted brightness error;
a gate configured to receive said gate control signal and said detected scratch signal and operating on said detected scratch signal to produce a gated scratch signal;
and a subtractor configured to receive the input image and said gated scratch signal and subtracting said gated scratch signal from the input image to provide a repaired output image.

2. Apparatus according to claim 1, wherein said gate control unit receives said measure of unimpaired brightness from said or one of said scratch detection circuits.

3. Apparatus according to claim 1, comprising a correlation unit serving to compare a relationship between impaired brightness values and corresponding modified brightness with an expected relationship measure.

4. Apparatus according to claim 3, wherein said gate is configured to reduce the gated scratch signal as said relationship departs from said expected relationship.

5. Apparatus according to claim 3 in which:
the relationship is used to predict the expected brightness error due to a scratch for a point in the image; and
a brightness change that repairs scratch impairment at the said point is limited in dependence upon the predicted brightness error.

6. Apparatus according to claim 3 in which the relationship between the impaired brightness values and corresponding modified brightness values is represented by a mathematical model.

7. Apparatus according to claim 6 in which the parameters of the model are derived by statistical analysis of the said set of brightness values.

8. Apparatus according to claim 7 in which the model is a linear model and its parameters are derived by linear regression.

9. Apparatus according to claim 1 comprising:
a first path providing the input mage to said subtractor; and
a second path containing a first said scratch detection circuit and said gate.

10. Apparatus according to claim 9, further comprising a noise reducer in said second path upstream of said scratch detection circuit.

11. Apparatus according to claim 9, further comprising a third path, connected to receive the input image in parallel with said first and second paths, said third path containing a second said scratch detection circuit.

12. Apparatus according to claim 11, wherein said third path contains a correlation unit serving to compare a relationship between impaired brightness values and corresponding modified brightness with an expected relationship measure.

13. Apparatus according to claim 11, wherein said third path contains a vertical filter upstream of said second scratch detection circuit.

14. A method for repairing scratch impairments to an impaired input image to provide a repaired output image comprising the steps of: identifying brightness values for a set of points within a narrow region of the impaired input image that is aligned with an expected scratch direction, said points having respective impaired brightness values;
modifying brightness values for said points in a first scratch repair process, said first scratch repair process serving at each point in said set of points to replace an impaired brightness value by a modified brightness value;
evaluating a relationship measure between the impaired brightness values and corresponding modified brightness values for the said set of points;
and controlling a second scratch repair process that provides said repaired output image in dependence upon a predicted brightness error.

15. A method according to claim 14 in which:
said relationship measure is compared with an expected relationship measure for said set of scratch impaired points; and
a scratch repair that is applied to the said image region is inhibited when the result of the said comparison is unlike the expected result.

16. A method according to claim 14 in which:
said relationship measure is used to predict the expected brightness error due to a scratch for a point in the image; and
a brightness change that repairs scratch impairment at the said point is limited in dependence upon the predicted brightness error.

17. A method according to claim 14 in which the relationship between the impaired brightness values and corresponding modified brightness values is represented by a mathematical model.

18. A method according to claim 17 in which said mathematical model is a linear model and its parameters are derived by linear regression.

19. A method according to claim 14 in which the scratch repair process that provides a repaired output image creates a correction signal that is combined with the input image to create a repaired output image by the steps of:
noise reducing the input image;
applying a scratch repair process to the noise-reduced input image; and
taking the difference between the input and the output of that scratch repair process as the said scratch correction signal.

20. A non-transitory computer program product comprising: code causing programmable apparatus to implement a method for repairing scratch impairments to an impaired input image to provide a repaired output image, the method comprising the steps of:
identifying brightness values for a set of points within a narrow region of the impaired input image that is aligned with an expected scratch direction, said points having respective impaired brightness values;
modifying brightness values for said points in a first scratch repair process, said first scratch repair process serving at each point in said set of points to replace an impaired brightness value by a modified brightness value;
evaluating a measure of the relationship between the impaired brightness values and corresponding modified brightness values for the said set of points; and controlling a second scratch repair process that provides said repaired output image in dependence upon a predicted brightness error.

* * * * *